United States Patent [19]

Donaldson et al.

[11] 4,443,416

[45] Apr. 17, 1984

[54] PURIFICATION OF BAYER PROCESS LIQUORS

[75] Inventors: Donald J. Donaldson, Orinda; Allan C. Kelly, Pleasanton; Joseph W. Mulloy, Orinda; Donald R. Zwakenberg, Oakland, all of Calif.

[73] Assignee: Kaiser Aluminum & Chemical Corporation, Oakland, Calif.

[21] Appl. No.: 485,807

[22] Filed: Apr. 18, 1983

[51] Int. Cl.³ .............................................. C01F 7/06
[52] U.S. Cl. ................................. 423/122; 423/121; 423/130
[58] Field of Search ................. 423/121, 122, 128–130

[56] References Cited

U.S. PATENT DOCUMENTS

| | | | |
|---|---|---|---|
| 2,981,600 | 4/1961 | Porter | 423/130 |
| 3,341,286 | 9/1967 | Mercier et al. | 423/130 |
| 3,372,985 | 3/1968 | Roberts et al. | 423/130 |
| 4,046,855 | 9/1977 | Schepers et al. | 423/130 |
| 4,101,629 | 7/1978 | Mercier et al. | 423/122 |
| 4,335,082 | 6/1982 | Matyasi et al. | 423/122 |

FOREIGN PATENT DOCUMENTS 1158048  7/1969  United Kingdom ............... 423/122

Primary Examiner—Herbert T. Carter
Attorney, Agent, or Firm—Andrew E. Barlay

[57] ABSTRACT

Sodium oxalate impurity is removed from oxalate-enriched Bayer process caustic liquor by gradual increase of the caustic concentration of the liquor, thus providing a staged precipitation of the sodium oxalate in a well-crystallized and readily filterable form.

5 Claims, 2 Drawing Figures

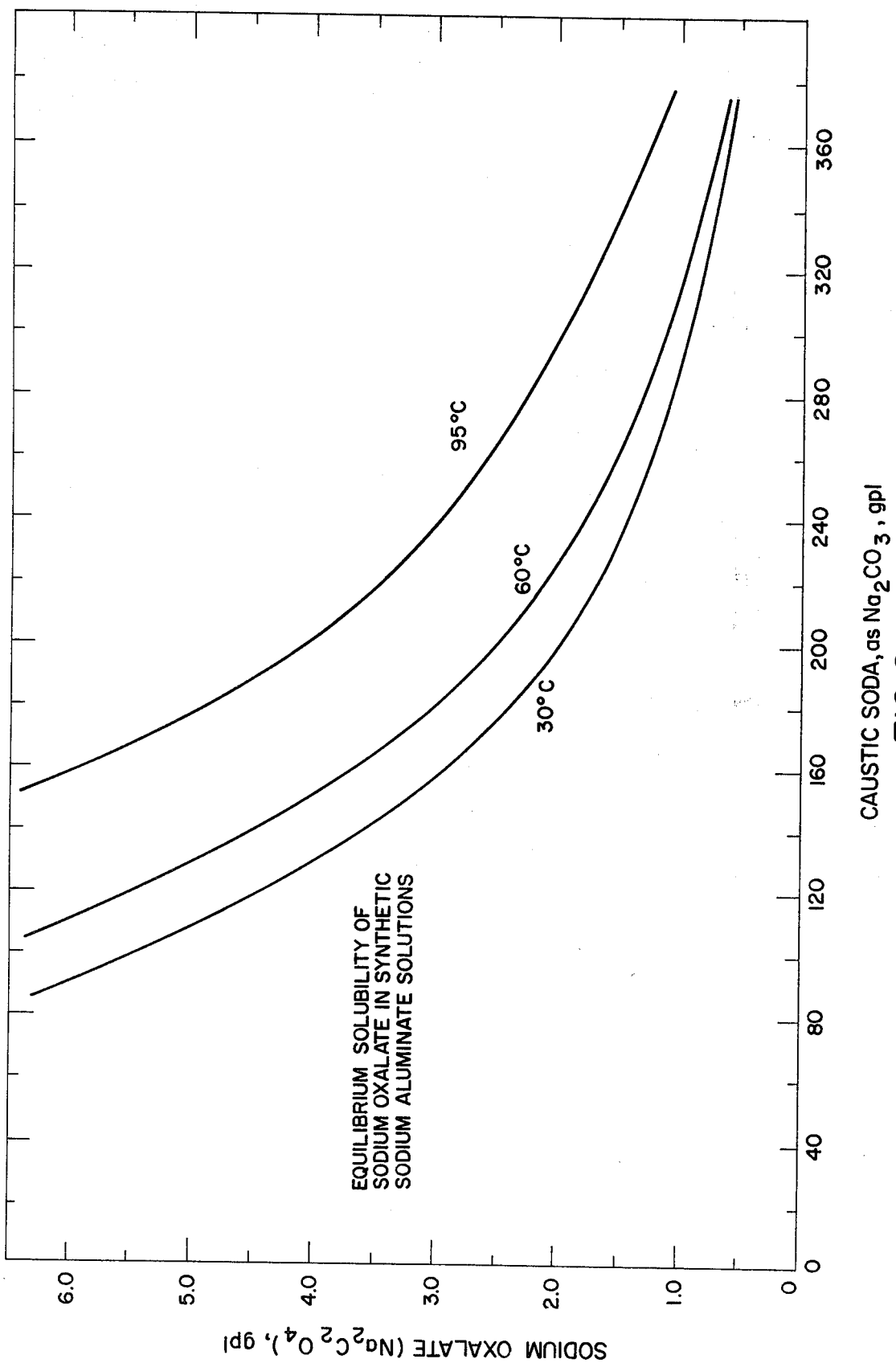

PURIFICATION OF BAYER PROCESS LIQUORS

BACKGROUND OF THE INVENTION

This invention relates to the removal of organic impurities from Bayer process liquors. More particularly, it relates to the removal of dissolved sodium oxalate salts from caustic Bayer process liquors.

In the Bayer process, bauxite ore is subjected to digestion with a caustic liquor at elevated temperatures and pressures. The digestion results in a caustic-soluble liquid phase containing substantially all of the caustic-soluble alumina content of the bauxite, together with other caustic-soluble constituents and a caustic-insoluble solid phase generally referred to as "red mud". After separation of the liquid phase (pregnant liquor) from the insoluble solids, the alumina content of the pregnant liquor is usually recovered by seeded crystallization. The liquor depleted in its alumina content is generally referred to as "spent" liquor and this spent liquor is commonly reused for digestion of a fresh charge of bauxite after its caustic concentration is reestablished by evaporation and by addition of "make-up" caustic.

Bauxites, regardless of their geographical origin, always contain organic compounds in varying amounts. These organic compounds are usually referred to as "humates" since they originate from the humus content of the soil present in the bauxite ore. During digestion of the bauxite at the temperatures and pressures employed in both the European and American Bayer processes, these humates oxidize to lower molecular weight organic compounds and in the presence of caustic, produce caustic soluble salts, such as oxalate, acetate, and succinate salts. The oxalate in solution is usually coprecipitated with the alumina content of the pregnant liquor in the form of very fine particles. These fine organic particles form nucleation sites for the alumina hydrate which as a consequence will also precipitate as fine particles. This organic compound can also coat the surfaces of the precipitated alumina hydrate particles and thus prevent agglomeration and/or growth of the hydrate particles. Agglomeration and/or growth is required for the formation of coarse and strong alumina hydrate capable of withstanding the subsequent processing steps, including high temperature calcination and the handling of the calcined alumina.

Humates are not the only source of organics in Bayer liquors. To improve the settling properties of the caustic insoluble phase generated by digestion of bauxite, settling aids or flocculants are added. These settling aids are organic compounds, for example, starch or man-made polymers, and during the course of the Bayer process, some of these also degrade and contaminate the liquor.

Due to the extensive recycling of liquor in the Bayer process, the oxalate level gradually increases to undesirably high levels and unless provisions are made for purification, serious operational problems will arise due to precipitation resulting in product contamination and scaling of process equipment.

Removal of organic impurities from Bayer liquors is a long-recognized necessity and numerous methods were disclosed for accomplishing such a purification. In U.S. Pat. No. 3,372,985 (Roberts et al), an oxalate removal method is described involving the sequential washing of the precipitated alumina hydrate. In the first stage, adhered caustic is removed from the surface of the hydrate by a cold water wash; in the second stage, hot water is utilized which dissolves sodium oxalate without hydrate losses. From the sodium oxalate solution, oxalate is removed by addition of lime which will form an essentially insoluble calcium oxalate solid. U.S. Pat. No. 3,649,185 (Sato et al) employs temperature control to reduce the solubility of sodium oxalate and precipitate oxalate crystals from a Bayer process stream rich in oxalate content and having a low dissolved alumina content. The removal efficiency varies as a function of temperature, caustic concentration, and oxalate content. Seeded crystallization is utilized in U.S. Pat. No. 3,899,571 (Yamada et al) to remove oxalate impurities from Bayer liquors. The process of this patent involves the addition of sodium oxalate crystals to a sodium aluminate solution contaminated with oxalate. The quantity of oxalate seed added is selected to be sufficient for shifting the equilibrium solubility of the dissolved oxalate impurity content resulting in precipitation of a portion of the dissolved oxalate. The precipitated oxalate is washed and a portion of the washed oxalate is recycled as seed for the treatment of an oxalate-contaminated sodium aluminate solution.

Removal of oxalate from a concentrated Bayer process stream by the use of a packed column is shown in U.S. Pat. No. 4,038,039 (Carruthers et al). Spent liquor is concentrated by evaporation and the concentrated liquor is sprayed on the top of a column packed, for example, with steel turnings. The concentrated liquor is supersaturated with sodium oxalate and as this liquor contacts the packing, precipitation of oxalate will take place. Purified liquor is recovered from the column and the oxalate precipitate is removed from the packing surfaces by hot water wash.

Harmful organic compounds are removed from Bayer process liquors by treating the contaminated liquor with a magnesium compound in accordance with the teachings of U.S. Pat. No. 4,046,855 (Schepers et al). The magnesium compound forms a precipitate when added to the impure liquor and the precipitate will contain a portion of the organic impurities which can be removed from the liquor, together with the precipitate. U.S. Pat. No. 4,215,094 (Inao et al) employs an oxidative process for the removal of organics from Bayer liquors. Contaminated Bayer liquor is contacted at elevated temperatures and pressures with oxygen in the presence of a copper catalyst. Oxidation degrades the organics to carbon dioxide and thus decreases the organic content of the treated liquor.

In U.S. Pat. No. 4,263,261 (Yamada et al) sodium oxalate impurities are removed from Bayer process liquors by seeded crystallization. Sodium oxalate crystals are added with vanadium and/or phosphorus-containing salts and the resulting precipitate is reused for renewed impurity removal by crystallization. The oxalate level of impure Bayer liquors can, according to U.S. Pat. No. 4,335,082, be controlled by causticizing the liquor with lime, followed by evaporation. Evaporation increases the caustic concentration of the liquor to 200–400 g/l, at this concentration solids will precipitate containing a portion of the organic impurities. The purified liquor is recycled to the Bayer process while the precipitate is discarded.

From the extent of the prior art discussed above, it can be seen that the presence of oxalate in Bayer liquors is a serious problem and the numerous processes advanced by the prior art indicate the continued need for a simple but effective and economical oxalate removal process.

It has now been found that sodium oxalate impurity can be removed in an efficient and economical manner from Bayer process streams by gradually increasing the caustic concentration of the liquor, thus providing for a staged removal of the oxalate content by precipitation.

BRIEF SUMMARY OF THE INVENTION

A process is provided for the removal of sodium oxalate impurites from Bayer process caustic liquors. The purification process involves the gradual increase of the caustic concentration of the impure liquor to such a level which reduces the solubility of the sodium oxalate at the treatment temperature and causes precipitation of the oxalate in well-filterable form. Suitably, the minimum caustic concentration to be used for the oxalate precipitation is in excess of about 250 g/l calculated as $Na_2CO_3$ grams equivalent, preferably in excess of 300 g/l at temperatures in the range of about 20°–85° C. This treatment causes precipitation of a significant quantity, generally in excess of about 50% by weight of oxalate calculated as sodium oxalate.

BRIEF DESCRIPTION OF THE DRAWINGS

FIG. 2 graphically shows oxalate equilibrium solubility in caustic liquors at varying temperatures.

DETAILED DESCRIPTION OF THE INVENTION

Figure 1:
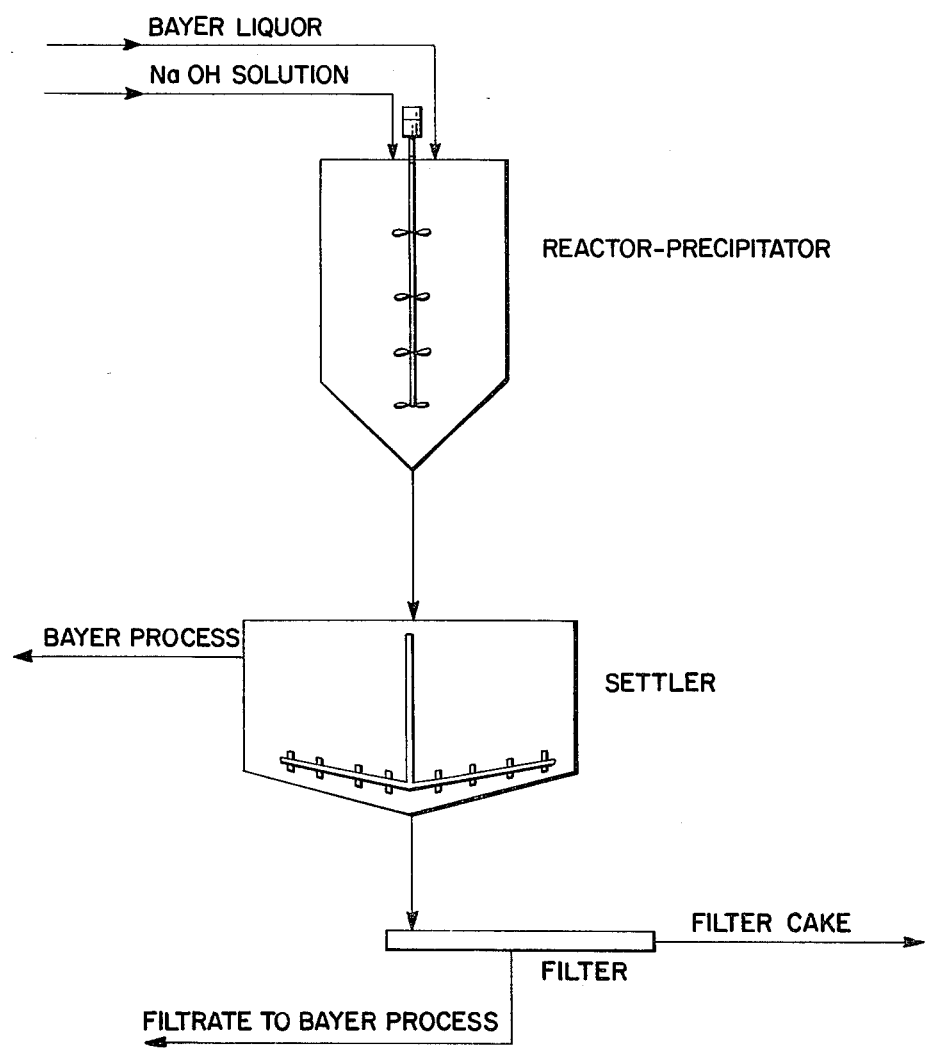
FIG. 1 schematically shows an embodiment of the purification process allowing batch, semicontinuous or continuous removal of oxalate impurities from Bayer process caustic liquors.

This invention concerns the purification of impure Bayer process caustic liquors. More specifically, it relates to the removal of oxalate impurities from contaminated Bayer process streams by decreasing the solubility of the oxalate impurity through gradual addition of a relatively concentrated caustic solution.

For the purposes of this invention, the term "Bayer process" refers to the production of alumina hydrate ($Al_2O_3.3H_2O$) from bauxite ore by digestion of the bauxite at elevated temperatures and pressures with a caustic liquor. Digestion produces a caustic-soluble liquor containing the extracted alumina values in solution as a caustic aluminate and a caustic-insoluble residue commonly referred to as "red mud". After separation of the mud from the liquor, alumina hydrate is recovered from the liquor by seeded precipitation. The residual liquor, depleted in alumina content, is referred to as "spent" liquor.

For the purposes of this invention, the expressions "caustic liquor" or "caustic solution" refer to an aqueous solution containing free and bound sodium hydroxide; "caustic concentration" as used herein refers to the combined free and bound caustic content expressed as $Na_2CO_3 g/l$.

The terms "oxalate" or "sodium oxalate" as used herein include, in addition to the compound $Na_2C_2O_4$, those carboxylic acids which are dissolved in the caustic liquor and coprecipitate with $Na_2C_2O_4$ under the conditions of the instant process. These may include fatty acids of higher molecular weight, e.g., $C_6$ or higher or humic acid salts.

The present purification process is based on the discovery that sodium oxalate can be crystallized in filterable form from caustic liquors by reducing the solubility of this organic impurity. This is accomplished by addition of a relatively pure caustic solution to the impure liquor in a gradual manner without the introduction of any external oxalate or other seed material as practiced by the prior art. In the present process, preferably any Bayer caustic liquor can be subjected to the purification method. Typical liquors include spent liquor and filtrates from the hydrate washes. It is to be understood, however, that the process of the present invention can be readily applied to any Bayer process liquor contaminated with oxalate.

The quantity of caustic to be added to the oxalate-contaminated liquor depends on the temperature of the liquor to be treated and the final oxalate concentration desired in the treated liquor. The aim is to reduce the solubility of the oxalate impurity in the liquor and this can be readily established for any given treatment temperature.

The concentration of the caustic soda solution to be added for oxalate precipitation is suitably high in order to avoid unnecessary dilution of the treated impure caustic liquor. Generally, the caustic to be utilized should have an NaOH concentration in the range of about 40–73%, the preferred concentration range found to be suitable is within the range of about 40% to about 50%.

The oxalate removal process is generally accomplished at temperatures below about 100° C. Good oxalate removal efficiencies are generally obtained within the temperature range from about 15° C. to about 90° C. The preferred operation temperature for the process was found to be within the range of about 20° C. and about 85° C.

Contact between the impure Bayer liquor and the caustic treating agent should be not less than about 30 minutes, it has been found that contact or residence times in the range of about 35–180 minutes under agitation provides a satisfactory rate of oxalate precipitation. The addition of caustic to the impure liquor can be accomplished either in a batchwise or in a continuous manner. In a batch mode of operation, the caustic is gradually added under agitation to a vessel or reactor. Precipitation is induced by the caustic addition and after approximately 30–35 minutes, counted from the start of the addition, readily filterable oxalate crystals can be recovered. Usually, the precipitation is complete within 60–100 minutes from the start of the addition, provided all of the necessary caustic is added within a 60-minute period. In a continuous process, addition may be accomplished in a concurrent or countercurrent manner to a stream of impure Bayer liquor, the average residence time of the contacted streams should also be in the 30–100 minute range.

Subsequent to the treatment of the impure Bayer liquor with the caustic solution, the precipitated oxalate impurity is removed. Removal can be accomplished by conventional means, for example, by settling, filtration, or centrifugation. The precipitated solid impurities are in crystalline form which allows ready separation.

The separated sodium oxalate, generally after washing with dilute caustic liquor saturated with oxalate to remove and recover adhered caustic, can be utilized as such, or if recovery of its sodium content is desired, can be causticized with calcium hydroxide. The formed calcium oxalate can either be utilized or if desired discarded.

The purified liquor, having a substantially decreased oxalate content can be recycled to the Bayer process and this further utilized in the Bayer cycle. If the precipitated sodium oxalate has been causticized for sodium recovery purposes, the recovered liquid phase containing sodium values, can be combined with the purified liquor.

DETERMINATION OF SODIUM OXALATE SOLUBILITY

The equilibrium solubility of sodium oxalate in caustic liquor was determined at varying oxalate concentrations and at constant temperature. Several caustic solutions were prepared each having the same caustic concentration but varying oxalate levels. These solutions were kept at 95°, 60°, and 30° C. and to each a 50% solution of NaOH was added to determine the required caustic level for inducing oxalate precipitation. The results are graphically shown in FIG. 2 and were used for accomplishing the sodium oxalate removal shown in the Example below.

The following example will further illustrate the utility of the present invention.

EXAMPLE

In this example, removal of oxalate from a Bayer liquor stream is shown and reference is made to FIG. 1. The Bayer liquor stream originated from the precipitation step of the Bayer cycle and in particular it was the filtrate obtained in the washing step of the alumina hydrate recovered from pregnant liquor. In the washing step, hot water is being preferably utilized to dissolve the precipitated sodium oxalate at a high degree of efficiency without undue dilution of the filtrate with water. This minimizes the need for fresh caustic to be added. The Bayer liquor subjected to the novel purification treatment had an A/C ratio of 0.324, a caustic concentration of 46 g/l and a dissolved oxalate content of 12.65 g/l expressed as sodium oxalate. The temperature of the Bayer liquor was about 59° C. This liquor was introduced into a reactor at the rate of 11 m$^3$/hour for a period of 1 hour. This liquor was then agitated and a 50% aqueous caustic soda solution (as NaOH) was then charged to the reactor at the rate of 5.1 m$^3$/hour for a period of 1 hour. The temperature of this caustic solution was 27° C. The combined liquors has a temperature of about 71° C. Precipitation of the oxalate impurity began shortly after the introduction of the caustic solution and was completed in the 60-minute reaction time. The slurry generated in the reactor and containing 7 g/l solids was then discharged at a rate of 16.1 m$^3$/hour to a conventional settler which was equipped with a rotating rake. The slurry was kept in this settler for a time period required for the separation of the solids from the liquor phase. From the settler, the underflow slurry, containing about 125 grams/liter oxalate (approximately 10% solids) was discharged to a filter at a rate of 1.6 m$^3$/hour, where it was filtered and a filter cake consisting essentially of sodium oxalate was recovered. The settler overflow containing about 370 g/l caustic and a reduced dissolved oxalate content (~1.0 g/l) was employed for cleaning purposes. The process as described resulted in an oxalate removal efficiency of about 88%.

We claim:

1. A process for removing dissolved sodium oxalate impurity from oxalate-contaminated Bayer process liquors which comprises contacting the contaminated liquor with a caustic solution having an NaOH concentration in the range of about 400–730 grams/liter, at a temperature within the range of about 20° to about 85° C., the quantity of caustic solution being sufficient to provide a caustic concentration for the combined liquor-solution in excess of about 250 grams/liter calculated as Na$_2$CO$_3$ grams equivalent, maintaining the contact between the liquor and the caustic solution for a time period from about 35 to about 180 minutes to precipitate sodium oxalate, separating the precipitated sodium oxalate and recovering a liquor of significantly reduced oxalate impurity content.

2. Process according to claim 1, wherein the contaminated Bayer process liquor is the filtrate generated by filtering and washing freshly precipitated alumina hydrate from pregnant Bayer process liquor.

3. Process according to claim 2, wherein the washing of the freshly precipitated alumina hydrate is accomplished with hot water.

4. Process according to claim 1, wherein the purified Bayer process liquor is reused in the Bayer process.

5. Process according to claim 1, wherein the precipitated sodium oxalate is causticized with calcium hydroxide to form calcium oxalate and to recover caustic values.

* * * * *